United States Patent
Kang et al.

(10) Patent No.: US 10,907,053 B2
(45) Date of Patent: Feb. 2, 2021

(54) AQUEOUS ANTI-RUST SURFACE TREATMENT COMPOSITION AND SURFACE-COATED METAL MEMBER

(71) Applicant: HODEN SEIMITSU KAKO KENKYUSYO CO., LTD., Atsugi (JP)

(72) Inventors: Yukihiro Kang, Kanagawa (JP); Takafumi Koshina, Kanagawa (JP)

(73) Assignee: HODEN SEIMITSU KAKO KENKYUSYO CO., LTD., Atsugi (JP)

( * ) Notice: Subject to any disclaimer, the term of this patent is extended or adjusted under 35 U.S.C. 154(b) by 190 days.

(21) Appl. No.: 16/300,248

(22) PCT Filed: Apr. 28, 2017

(86) PCT No.: PCT/JP2017/016910
§ 371 (c)(1),
(2) Date: Nov. 9, 2018

(87) PCT Pub. No.: WO2017/195652
PCT Pub. Date: Nov. 16, 2017

(65) Prior Publication Data
US 2019/0144688 A1 May 16, 2019

(30) Foreign Application Priority Data
May 10, 2016 (JP) ................. 2016-094443

(51) Int. Cl.
| | | |
|---|---|---|
| *C09D 5/08* | (2006.01) | |
| *C09D 133/02* | (2006.01) | |
| *C09D 167/00* | (2006.01) | |
| *C09D 161/06* | (2006.01) | |
| *C09D 163/00* | (2006.01) | |
| *C23C 22/05* | (2006.01) | |
| *C09D 129/14* | (2006.01) | |
| *C09D 201/00* | (2006.01) | |
| *B32B 15/08* | (2006.01) | |
| *B32B 27/00* | (2006.01) | |
| *C09D 7/40* | (2018.01) | |
| *C09D 7/61* | (2018.01) | |
| *C09D 7/20* | (2018.01) | |
| *C09D 7/63* | (2018.01) | |
| *C23C 22/23* | (2006.01) | |
| *C08K 3/32* | (2006.01) | |
| *C08K 3/36* | (2006.01) | |
| *C08K 5/098* | (2006.01) | |
| *C08K 5/5435* | (2006.01) | |

(52) U.S. Cl.
CPC .............. *C09D 5/08* (2013.01); *B32B 15/08* (2013.01); *B32B 27/00* (2013.01); *C09D 7/20* (2018.01); *C09D 7/40* (2018.01); *C09D 7/61* (2018.01); *C09D 7/63* (2018.01); *C09D 129/14* (2013.01); *C09D 133/02* (2013.01); *C09D 161/06* (2013.01); *C09D 163/00* (2013.01); *C09D 167/00* (2013.01); *C09D 201/00* (2013.01); *C23C 22/05* (2013.01); *C23C 22/23* (2013.01); *C08K 3/32* (2013.01); *C08K 3/36* (2013.01); *C08K 5/098* (2013.01); *C08K 5/5435* (2013.01); *C08K 2003/324* (2013.01)

(58) Field of Classification Search
CPC .......... B32B 15/08; B32B 27/00; C08K 3/32; C08K 3/36; C08K 5/098; C08K 2/5435; C08K 2003/324; C09D 5/08; C09D 7/20; C09D 7/40; C09D 7/61; C09D 7/63; C09D 129/14; C09D 133/02; C09D 161/06; C09D 163/00; C09D 167/00; C09D 201/00; C23C 22/05; C23C 22/23
See application file for complete search history.

(56) References Cited

U.S. PATENT DOCUMENTS

| | | |
|---|---|---|
| 6,475,300 B2 | 11/2002 | Shimakura et al. |
| 9,879,345 B2 | 1/2018 | Matsui et al. |
| 2001/0042491 A1 | 11/2001 | Shimakura et al. |
| 2015/0027342 A1 | 1/2015 | Matsui et al. |

FOREIGN PATENT DOCUMENTS

| | | | |
|---|---|---|---|
| CN | 103820778 A | * | 5/2014 |
| CN | 105483666 A | | 4/2016 |
| EP | 1643009 A1 | | 4/2006 |
| JP | 2012-77370 A | | 4/1920 |
| JP | 2001-316845 A | | 11/2001 |
| JP | 2006-213958 A | | 8/2006 |
| JP | 2013-185235 A | | 9/2013 |

(Continued)

OTHER PUBLICATIONS

Extended European Search Report dated Dec. 10, 2019, in European Patent Application No. 17796013.5.
International Search Report, issued in PCT/JP2017/016910, PCT/ISA/210, dated Jun. 13, 2017.
Written Opinion of the International Searching Authority, issued in PCT/JP2017/016910, PCT/ISA/237, dated Jun. 13, 2017.

(Continued)

*Primary Examiner* — Anthony J Green
(74) *Attorney, Agent, or Firm* — Birch, Stewart, Kolasch & Birch, LLP

(57) ABSTRACT

An aqueous anti-rust surface treatment composition used for forming a film on a surface of a metal member of the present invention contains a silane coupling agent; a water-soluble transition metal compound containing a water-soluble titanium compound or a water-soluble zirconium compound; a condensed phosphate; and a solvent containing water, in which the condensed phosphate contains a highly condensed phosphate which is a salt of high condensate of equal to or more than four phosphoric acids.

15 Claims, No Drawings

(56) References Cited

FOREIGN PATENT DOCUMENTS

| JP | 2013-227646 A | 11/2013 |
| JP | 2014-237880 A | 12/2014 |
| WO | WO 2004/005579 A1 | 1/2004 |

OTHER PUBLICATIONS

Japanese Office Action for Japanese Application No. 2020-003450, dated Sep. 29, 2020.

* cited by examiner

AQUEOUS ANTI-RUST SURFACE TREATMENT COMPOSITION AND SURFACE-COATED METAL MEMBER

TECHNICAL FIELD

The present invention relates to an aqueous anti-rust surface treatment composition and a surface-coated metal member.

BACKGROUND ART

Various developments have been made for a surface treatment agent on a metal surface. For example, Patent Document 1 discloses a water-based metal surface treatment agent containing an aqueous organic resin, a hydrolytic condensate, a colloidal silica, an organic phosphoric acid compound, an anti-rust metal compound, and a wax.

In addition, Patent Document 2 discloses a surface treatment agent containing a water-soluble polyvalent metal phosphate compound, an inorganic titanium compound, and an organic titanium compound.

Organic phosphorous acid and a salt thereof is described as the organic phosphoric acid compound disclosed in Patent Document 1, and primary aluminum phosphate and primary magnesium phosphate are described as the polyvalent metal phosphate compound disclosed in Patent Document 2.

RELATED DOCUMENT

Patent Document

[Patent Document 1] Japanese Unexamined Patent Publication No. 2014-237880
[Patent Document 2] Japanese Unexamined Patent Publication No. 2013-227646

SUMMARY OF THE INVENTION

However, as a result of investigations made by the present inventors, it was found that in the surface treatment agent containing phosphate disclosed in the above Patent Documents, there was a need for improvement in the anti-rust property of the metal member.

As a result of intensive studies from the viewpoint of corrosion resistance of the film, the present inventors have found that although a detailed mechanism is not certain, an aqueous anti-rust surface treatment composition can realize a film structure excellent in corrosion resistance by using a highly condensed phosphate which is a salt of highly condensed product of a predetermined number or more of phosphoric acids in addition to a silane coupling agent and a water-soluble transition metal compound, it is possible to improve rust-prevention of the metal member, and with this, the present invention has been completed.

According to the present invention, there is provided an aqueous anti-rust surface treatment composition used for forming a film on a surface of a metal member containing a silane coupling agent; a water-soluble transition metal compound containing a water-soluble titanium compound or a water-soluble zirconium compound; a condensed phosphate; and a solvent containing water, in which the condensed phosphate can contain a highly condensed phosphate which is a salt of high condensate of equal to or more than four phosphoric acids.

According to the present invention, there is provided an aqueous anti-rust surface treatment composition which imparts anti-rust performance to a metal member by being applied to the metal member, including a silane coupling agent; a titanium chelating agent; a salt of polyphosphoric acid having condensation degree of equal to or more than 4; and water, in which the content of the salt of polyphosphoric acid having condensation degree of equal to or more than 4 can be equal to or more than 1 part by mass and equal to or less than 100 parts by mass, with respect to the content of the silane coupling agent of 100 parts by mass.

Further, according to the present invention, there is provided a surface-coated metal member including a metal member; and a film formed of the aqueous anti-rust surface treatment composition, the film being formed on the surface of the metal member.

According to the present invention, there are provided an aqueous anti-rust surface treatment composition and a surface-coated metal member capable of forming a film having high corrosion resistance on a surface of a metal member.

DESCRIPTION OF EMBODIMENTS

Hereinafter, the present invention will be described in detail based on embodiments.

Note that, in Japanese specification, unless otherwise specified, "~" is translated as "equal to or more than and equal to or less than".

[Aqueous Anti-Rust Surface Treatment Composition]

An outline of an aqueous anti-rust surface treatment composition according to this embodiment will be described.

The aqueous anti-rust surface treatment composition of this embodiment can contain a silane coupling agent, a water-soluble transition metal compound containing a water-soluble titanium compound or a water-soluble zirconium compound, a condensed phosphate, and a solvent containing water. In the aqueous anti-rust surface treatment composition, the condensed phosphate can contain a highly condensed phosphate which is a salt of high condensate of equal to or more than four phosphoric acids. Such an aqueous anti-rust surface treatment composition can be used for forming a film on a surface of a metal member.

Since the aqueous anti-rust surface treatment composition of this embodiment can realize a film structure excellent in corrosion resistance by using the highly condensed phosphate which is a salt of highly condensed product of a predetermined number or more of phosphoric acids in addition to the silane coupling agent and the water-soluble transition metal compound, it is possible to improve anti-rust property of the metal member.

Although a detailed mechanism is not certain, it is considered that a film having a cross-linked structure is formed by dehydration condensation reaction between the hydrolyzed condensate of the silane coupling agent and the water-soluble transition metal compound, and in the film, a denseness of the film can be enhanced by appropriately coordinating phosphate ions derived from the highly condensed phosphate, with respect to a transition metal atom derived from the water-soluble transition metal compound, thereby realizing a film structure excellent in corrosion resistance. Among the transition metal atoms, if titanium is used, an anti-rust effect can be enhanced as compared with other transition metal atoms such as zirconium. Although a detailed mechanism is not certain, it is considered that the use of titanium makes the film structure denser.

As a result of investigations made by the present inventors, it has been found that, in a case where in the surface treatment agent, an ordinary phosphate which is not condensed with phosphoric acid or a low condensed phosphate having a low condensation number of phosphoric acids such as diphosphate, and triphosphate was used, there was a need for improvement in the corrosion resistance of the film.

On the other hand, according to this embodiment, when the highly condensed phosphate which is a salt of highly condensed product of a predetermined number or more of phosphoric acids is used, it is possible to impart a high anti-rust effect to the metal member as compared with a case of using the phosphate, which is not condensed, or equal to or less than three low condensed phosphates. Although a detailed mechanism is not certain, when the highly condensed phosphates include the highly condensed phosphate having a chain structure, those can be appropriately arranged in the film structure. In this case, it is possible to further enhance the anti-rust effect as compared with a case of using a linear chain.

As an example of the aqueous anti-rust surface treatment composition of this embodiment, an aqueous anti-rust surface treatment composition which imparts anti-rust performance to a metal member by being applied to a surface of the metal member can be exemplified, and the aqueous anti-rust surface treatment composition contains a silane coupling agent, a titanium chelating agent, a salt of polyphosphoric acid having condensation degree of equal to or more than 4, and water, in which the content of the salt of polyphosphoric acid having condensation degree of equal to or more than 4 can be equal to or more than 1 part by mass and equal to or less than 100 parts by mass, with respect to 100 parts by mass of content of the silane coupling agent. Thus, by using the aqueous anti-rust surface treatment composition containing a specific amount of a salt of polyphosphoric acid having a specific condensation degree, for example, a film realizing a higher level of corrosion resistance than the phosphate-containing surface treatment agent can be provided.

In addition, the aqueous anti-rust surface treatment composition of this embodiment can further contain an aqueous colloidal silica. As a result, it is possible to realize a strong film structure for the silica film (dried film) obtained by drying the aqueous anti-rust surface treatment composition. Although a detailed mechanism is not certain, it is considered that in a film having a cross-linked structure through an oxygen atom between the silicon atom derived from the silane coupling agent and the transition metal atom derived from the water-soluble transition metal compound and a structure in which phosphate ions derived from the highly condensed phosphate to the transition metal atom are appropriately coordinated, silica is appropriately disposed in the remaining space, so that the denseness in the silica-film is increased and the corrosion resistance is improved.

In the aqueous anti-rust surface treatment composition of this embodiment, each component can be composed of a water-soluble component. As a result, the aqueous anti-rust surface treatment composition of this embodiment can be diluted with water and excellent in water dilutability. Since such an aqueous anti-rust surface treatment composition is also excellent in the coating properties, it is possible to realize a thin layer film.

Further, the aqueous anti-rust surface treatment composition of this embodiment may include a mixed solvent containing water and a polar organic solvent such as an alcohol. This makes it possible to appropriately control a state in the solvent such as the silane coupling agent, the water-soluble transition metal compound such as the titanium chelating agent, and the aqueous colloidal silica, so that gelation is suppressed, and thereby it is possible to realize an aqueous anti-rust surface treatment composition excellent in long-term liquid stability.

Further, the aqueous anti-rust surface treatment composition of this embodiment can be a chromium-free anti-rust surface treatment agent containing no chromium component. With this, it is possible to realize an aqueous anti-rust surface treatment composition excellent in safety.

With the aqueous anti-rust surface treatment composition of this embodiment, it is possible to form a film on the surface of the metal member by a known method. This makes it possible to impart anti-rust performance to the metal member. For example, the film which is a dried film can be formed by forming a coated film on the surface of the metal member by a coating method such as a dipping method, a roll coating method, a spraying method, a brush coating method, and a spin coating method, and drying the coated film. According to this embodiment, the film made of the aqueous anti-rust surface treatment composition can be a film that imparts anti-rust property to the metal member.

In this embodiment, the surface-coated metal member can include a metal member and a film formed of the aqueous anti-rust surface treatment composition of this embodiment, the film being formed on the surface of the metal member.

Metal materials constituting a metal member can be appropriately set in accordance with use, and examples thereof include zinc, iron, copper, aluminum, tin, and an alloy containing these metals, plated steel with these metals, or a vapor deposition product.

Further, in this embodiment, these are preferably used in a case having a plating layer containing zinc or chromium on the metal member. For example, parts such as JIS H 8641: hot dip galvanizing, JIS H 8610: electro galvanizing, JIS H 8625: chromate film (including trivalent Cr), JIS G 3313: electro galvanized steel sheet, JIS G 3302: hot dip galvanized steel sheet may be used.

That is, the aqueous anti-rust surface treatment composition of this embodiment can be applied to the surface of the metal member having a sacrificial anticorrosion effect such as the plating layer containing zinc or chromium, and the anti-rust property can be further improved by forming a film on the surface of the metal member. Further, the aqueous anti-rust surface treatment composition of this embodiment can have excellent adhesion to the plating layer containing zinc or chromium. Although a detailed mechanism is not certain, it is considered that when the silicon atom derived from the silane coupling agent or the transition metal atom derived from the water-soluble transition metal compound chemically are bonded to the surface of the metal member through the oxygen atom, and the film and the metal member are physically bonded to each other, the adhesion between the film and the metal member can be enhanced. In addition, it is considered that the highly condensed phosphate reacts with zinc of the base to form a chemical conversion film, thereby increasing the corrosion resistance.

Hereinafter, each component for constituting the aqueous anti-rust surface treatment composition of this embodiment will be described.

(Silane Coupling Agent)

The aqueous anti-rust surface treatment composition of this embodiment can contain a silane coupling agent.

A water-soluble silane coupling agent capable of being dissolved in water and exhibiting neutrality when dissolved in water can be used as the silane coupling agent. This makes it possible to improve the affinity between the aqueous colloidal silica and the water-soluble transition metal compound such as the water-soluble titanium chelating agent or the water-soluble resin, and form a stable aqueous solution.

The silane coupling agent is, for example, alkoxy silane, represented by Formula: $(R^1)_m Si(OR^2)_{4-m}$ ($R^1$ is a functional group having 1 to 20 carbon atoms and $R^2$ is a lower alkyl group, and $m$ is an integer of 0 to 3) or a compound obtained by hydrolyzing and polycondensing the alkoxysilane.

Further, a part of the silane coupling agent of this embodiment may be hydrolyzed.

Specific example of the silane coupling agent represented by the above formula include $Si(OCH_3)_4$, $Si(OC_2H_5)_4$, $CH_3Si(OCH_3)_3$, $CH_3Si(OC_2H_5)_3$, $C_2H_5Si(OCH_3)_3$, $C_2H_5Si(OC_2H_5)_3$, $CH_2(O)CHCH_2O(CH_2)_3Si(OCH_3)_3$, $CH_2=C(CH_3)COO(CH_2)_3Si(OCH_3)_3$, $CH_2=CHCOO(CH_2)_3Si(OCH_3)_3$, $H_2N(CH_2)_3Si(OCH_3)_3$, $HS(CH_2)_3Si(OCH_3)_3$, and $OCN(CH_2)_3Si(OC_2H_5)_3$.

Further, in the above chemical formula, examples of the functional group include groups such as vinyl, 3-glycidoxypropyl, 3-glycidoxypropyl methyl, 2-(3, 4-epoxycyclohexyl) ethyl, p-styryl, 3-methacryloxypropyl, 3-methacryloxypropyl methyl, 3-acryloxypropyl, 3-aminopropyl, N-2-(aminoethyl)-3-aminopropyl, N-2-(aminoethyl)-3-aminopropyl methyl, N-phenyl-3-aminopropyl, N-(vinyl benzyl)-2-aminoethyl-3-aminopropyl, 3-ureidopropyl, 3-mercaptopropyl, and 3-isocyanate propyl.

Specific examples of the lower alkyl group in the above chemical formula include a linear or branched alkyl group such as methyl, ethyl, n-propyl, isopropyl, n-butyl, isobutyl, tert-butyl, sec-butyl, n-pentyl, 1-ethyl propyl, isopentyl, and neopentyl.

In this embodiment, a silane coupling agent which is a water-soluble silane coupling agent, particularly a silane coupling agent (that is, an epoxy silane) having an epoxy group in the functional group or a silane coupling agent having an amino group in the functional group (that is, aminosilane) is preferably included in the silane coupling agent, and the silane coupling agent having an epoxy group in the functional group (that is, epoxy silane) is more preferably included in the silane coupling agent.

In addition, examples of the silane coupling agent having an epoxy functional group, include 3-glycidoxypropyltrimethoxysilane, 3-glycidoxypropyl triethoxy silane, and 2-(3,4-epoxycyclohexyl ethyl)trimethoxy silane.

(Water-Soluble Transition Metal Compound)

The aqueous anti-rust surface treatment composition of this embodiment can contain a water-soluble transition metal compound. The water-soluble transition metal compound can contain a water-soluble titanium compound or a water-soluble zirconium compound. From the viewpoint of enhancing corrosion resistance, a water-soluble titanium compound can be used among them.

The water-soluble titanium compound may include at least one selected from the group consisting of an inorganic titanium compound, a peroxotitanate, an amine-based water-soluble titanate, and a chelate titanate (a water-soluble titanium chelating agent). Specific examples of the water-soluble titanium compound include an inorganic titanium compound such as titanium trichloride, titanium tetrachloride, titanium sulfate, or titanium oxychloride, inorganic or chelate peroxotitanate, amine type water-soluble titanate obtained by allowing titanium alkoxide and water to react with each other in the presence of amines, oxycarboxylic acid chelated titanium coordinated with an oxycarboxylic acid such as lactic acid, malic acid, citric acid, tartaric acid, gluconic acid, or glycol, chelate titanate (water-soluble titanium chelating agent) such as alkanolamine chelated titanium coordinated with alkanol such as monoethanolamine, diethanolamine, and triethanolamine.

The water-soluble zirconium compound can have a structure similar to that of the water-soluble titanium compound, and one or more kinds selected from the group consisting of, for example, an inorganic zirconium compound, peroxozirconate, amine-based water-soluble zirconate, and chelate zirconate can be contained.

The aqueous anti-rust surface treatment composition of this embodiment may contain, as a curing component, an organic transition metal compound, for example, an organic titanium compound such as organic titanium alkoxide, organic titanium chelate, and organic titanium acylate, an organic zirconium compound such as organic zirconium alkoxide, organic zirconium chelate, and organic zirconium acylate. By containing this curing component, it is possible to obtain a structure in which the component in the film structure is cross-linked with the curing component, and a self-crosslinking structure.

(Titanium Chelating Agent)

For the titanium chelating agent, for example, an organic compound represented by $Ti(X)_4$ as a general formula and an oligomer thereof can be used. Here, X is selected from a hydroxyl group, a lower alkoxy group, and a chelating substituent, and four X's may be the same as or different from each other.

The lower alkoxy group is an alkoxy group having 6 or less, preferably 4 or less carbon atoms such as methoxy, ethoxy, propoxy, isopropoxy, butoxy, isobutoxy, and tertbutoxy.

The chelating substituent is a group derived from an organic compound having a chelate forming performance. Examples of the organic compound having the chelate forming performance include β-diketones such as acetylacetone, alkyl carbonyl carboxylic acids such as acetoacetic acid and esters thereof, and alkanolamines such as triethanolamine.

Specific examples of the chelating substituent include lactate, ammonium lactate, triethanolaminate, acetylacetonate, acetoacetate, and ethyl acetoacetate.

Among these, from the viewpoint of improving the liquid stability of the aqueous anti-rust surface treatment composition of this embodiment, it is preferable to use one in which the chelating substituent of the titanium chelating agent is lactate (lactic acid ion).

For example, TC-400 (titanium diisopropoxy triethanolaminate) prepared by Matsumoto Fine Chemical Co., Ltd. chelated with triethanolamine exhibits alkalinity when dissolved in water. On the other hand, there are titanium lactate chelated with lactic acid and ammonium salts of the titanium lactate. For example, TC-310 manufactured by Matsumoto Fine Chemical Co., Ltd. exhibits an acidic pH when dissolved in water, and TC-300 is neutralized with ammonium and has a generally neutral pH.

The crosslinking reaction between the titanium chelating agent and the silane coupling agent proceeds after the aqueous anti-rust surface treatment composition is applied to the metal member and then is subjected to a condition of room temperature or higher. As a result, the chemical bonding with the silane coupling agent and other components is promoted, and a film with high strength is formed.

Regarding the aqueous anti-rust surface treatment composition of this embodiment, from the viewpoint of forming a film with high strength, the content of the titanium chelating agent is preferably, for example, equal to or more than 20 parts by mass, is more preferably equal to or more than 30 parts by mass, and is still more preferably equal to or more than 40 parts by mass, with respect to 100 parts by mass of content of the silane coupling agent. From the same viewpoint, the content of the titanium chelating agent is preferably, for example, equal to or less than 300 parts by mass, and is more preferably equal to or less than 250 parts by mass, and is still more preferably equal to or less than 200 parts by mass, with respect to 100 parts by mass of content of the silane coupling agent.

(Condensed Phosphate)

The aqueous anti-rust surface treatment composition of this embodiment can contain a condensed phosphate. The condensed phosphate can contain a highly water-soluble condensed phosphate which is a salt of a highly condensed product of equal to or more than four phosphoric acids.

The salt of polyphosphoric acid (that is, a highly condensed product of equal to or more than four phosphoric acids) having a condensation degree of equal to or more than 4 used in this embodiment is a component imparting the corrosion resistance to the surface of the metal member. As a result of investigations by the inventors of the present invention, it has been found that the corrosion resistance can be remarkably imparted to the metal member as compared with the case of using phosphoric acid having a low condensation degree or a salt thereof used in the related art.

The condensation degree of the polyphosphoric acid is equal to or more than 4, is more preferably equal to or more than 5, and is still more preferably equal to or more than 6. An upper limit value of the condensation degree is not particularly limited, but it is preferably, for example, equal to or less than 50, and is more preferably equal to or less than 40.

As the salt of polyphosphoric acid having high availability, a salt of "hexametaphosphoric acid" having a condensation degree of 6, a salt of "ultrapolyphosphoric acid" having an average condensation degree of 10 or more, and the like can be used.

Although polyphosphoric acid such as "ultra polyphosphoric acid" is usually traded as one having a distribution of condensation degree, the amount of polyphosphoric acid having a condensation degree of equal to or more than 4 in this embodiment can be determined as the amount of a component having a specific condensation degree value among the condensation degree of polyphosphoric acid.

The amount of the salt of polyphosphoric acid having such a specific condensation degree can be analyzed by a known method such as gel permeation chromatography (GPC) analysis, high performance liquid chromatography (HPLC) analysis.

The highly water-soluble condensed phosphate may have, for example, a linear structure, a cyclic structure, or a structure in which linear and cyclic structures are bonded to each other. Among them, the highly condensed phosphate preferably has a cyclic structure or a network structure.

Examples of the highly condensed phosphate having a cyclic structure include tetrametaphosphate, hexametaphosphate, and octametaphosphate.

As the highly condensed phosphate having a structure in which the linear and cyclic ones are bonded to each other, for example, ultrapolyphosphate and the like can be exemplified. The ultrapolyphosphate is hydrolyzed in an aqueous solution to become a mixture of a highly condensed phosphate having a linear structure and a highly condensed phosphate having a cyclic structure.

Among them, the highly condensed phosphate preferably contains at least a highly condensed phosphate having a cyclic structure. The highly condensed phosphates of the cyclic structure and the chain structure may be used in combination. By using the highly condensed phosphate having a cyclic structure, the corrosion resistance can be further enhanced.

In addition to the highly condensed phosphate, the aqueous anti-rust surface treatment composition of this embodiment may contain other condensed phosphates within a range where the effect of the present invention is exerted.

The condensed phosphate of this embodiment is configured as a salt of an anion of polyphosphoric acid and a corresponding cation. As this cation, sodium ion, potassium ion, lithium ion, calcium ion, magnesium ion, ammonium ion, and the like can be adopted.

Among these, from the availability of the salt of polyphosphoric acid and its solubility in water, it is inferred that this cation is sodium ion or potassium ion, that is, the highly condensed phosphate is a sodium salt or a potassium salt of polyphosphoric acid. Specifically, for example, sodium salts such as $nNa_2O \cdot P_2O_5$ ($0<n<1$), $(NaPO_3)_6$ can be exemplified.

Regarding the aqueous anti-rust surface treatment composition of this embodiment, from the viewpoint of realizing high corrosion resistance of the coating, the content of the salt of polyphosphoric acid having condensation degree of equal to or more than 4 is, for example, equal to or more than 1 part by mass, is preferably equal to or more than 5 parts by mass, is more preferably equal to or more than 8 parts by mass, is still more preferably equal to or more than 10 parts by mass, and is even still more preferably equal to or more than 15 parts by mass, with respect to 100 parts by mass of content of the silane coupling agent.

Further, regarding the aqueous anti-rust surface treatment composition, from the viewpoint of realizing high storage stability, the content of the salt of polyphosphoric acid having condensation degree of equal to or more than 4 is, for example, equal to or less than 100 parts by mass, is preferably equal to or less than 80 parts by mass, is more preferably equal to or less than 60 parts by mass, and is still more preferably equal to or less than 40 parts by mass, with respect to 100 parts by mass of content of the silane coupling agent.

(Aqueous Colloidal Silica)

The aqueous anti-rust surface treatment composition of this embodiment can contain an aqueous colloidal silica. With this, it is possible to further improve the strength of the film obtained from the aqueous anti-rust surface treatment composition.

The aqueous colloidal silica preferably has, for example, an average particle diameter in the range of 1 to 100 nm. In a case of using the colloidal silica having the average particle size within this range, by using a mixed solvent of water and alcohol, aggregation and sedimentation can be suppressed, a composition of a surface treatment agent excellent in liquid stability can be prepared, and it is possible to improve the anti-rust performance of the surface-treated product. In addition, since the dispersibility in the composition can be increased by using the aqueous colloidal silica, it is possible to form a protective film excellent in the corrosion resistance by uniformly dispersing and co-precipitating the silica particles in the film.

From the viewpoint of imparting moderate strength to the film formed from the aqueous anti-rust surface treatment composition, the content of the aqueous colloidal silica in a case of being contained in the aqueous anti-rust surface treatment composition of this embodiment is preferably, for example, equal to or more than 20 parts by mass, and is more preferably equal to or more than 40 parts by mass, and is still more preferably equal to or more than 60 parts by mass, with respect to 100 parts by mass of content of the silane coupling agent.

From the same viewpoint, the content of the aqueous colloidal silica is preferably, for example, equal to or less than 300 parts by mass, is more preferably equal to or less than 240 parts by mass, and is still more preferably equal to or less than 200 parts by mass, with respect to 100 parts by mass of content of the silane coupling agent.

Note that, the content of this aqueous colloidal silica is defined as the amount of solid content of silica.

(Water)

The aqueous anti-rust surface treatment composition of this embodiment can contain a solvent containing water.

Examples of the water include city water, distilled water, and ion exchange water. Further, the water may be water derived from a solution of an aqueous colloidal silica or a titanium chelate compound.

Further, the aqueous anti-rust surface treatment composition of this embodiment may include a mixed solvent containing a polar organic solvent (hydrophilic organic solvent) such as an alcohol. In this embodiment, it is possible to constitute a mixed solvent with alcohol together with water, and the amount of water can be determined in consideration of the chemical properties of each component, the blending amount, and the like.

(Alcohol)

The aqueous anti-rust surface treatment composition of this embodiment can contain an alcohol. This makes it possible to improve the solubility of each component in the composition and to improve the storage stability of the obtained composition. Although the reason is not certain, by using the mixed solvent containing water and an alcohol component, it is possible to improve the anti-rust performance that can be imparted by the film formed on the surface of the metal member having a zinc surface. In addition, when the alcohol is contained, foaming of the surface treatment agent is suppressed, and when the surface treatment agent is applied to a product, it is possible to prevent bubbles from entering the film and make the siliceous film nonuniform.

As the alcohol, in addition to an alcohol added as a solvent, an alcohol component such as ethanol or methanol produced by hydrolysis of the silane coupling agent may be used. The solution of the titanium chelating agent may also contain alcohol such as iso-propyl alcohol.

Examples of the alcohol include low boiling point alcohol having a boiling point of lower than 100° C. such as methanol, ethanol, n-propyl alcohol, and iso-propyl alcohol, and high boiling point alcohol having a boiling point of 100° C. or higher such as iso-butanol, methyl cellosolve, ethyl cellosolve, propylene glycol monomethyl ether (PGME), butyl cellosolve, ethylene glycol monoteric butyl ether (ETB), and diformaldehyde methoxyethanol.

Among them, in this embodiment, from the viewpoint of high availability and high solubility for each component, one or more kinds of alcohols selected from the group consisting of methanol, ethanol, n-propyl alcohol, iso-propyl alcohol, n-butyl alcohol, s-butyl alcohol, and t-butyl alcohol. Further, by using the low boiling point alcohol such as methyl alcohol (64.7° C.), ethyl alcohol (78.37° C.), iso-propyl alcohol (boiling point of 82.4° C.) it is possible to form a coated film in a lower temperature environment or a drying environment.

From the viewpoint of improving the solubility in each component and improving the storage stability of the aqueous anti-rust surface treatment composition, the content of the alcohol in a case of being contained in the aqueous anti-rust surface treatment composition of this embodiment is preferably, for example, equal to or more than 20 parts by mass, is more preferably equal to or more than 40 parts by mass, and is still more preferably equal to or more than 60 parts by mass, with respect to 100 parts by mass of content of the silane coupling agent.

From the same viewpoint, the content of the alcohol is preferably, for example, equal to or less than 300 parts by mass, is more preferably equal to or less than 250 parts by mass, and is still more preferably equal to or less than 200 parts by mass, with respect to 100 parts by mass of content of the silane coupling agent.

Further, in the aqueous anti-rust surface treatment composition of this embodiment, it is preferable that the amount of the alcohol with respect to the entire composition is set within an appropriate range. With this, it is possible to remarkably suppress denaturation in a case where the aqueous anti-rust surface treatment composition is stored for a long period of time.

More specifically, the content of the alcohol in the entire aqueous anti-rust surface treatment composition is preferably, for example, equal to or more than 3% by mass, is more preferably equal to or more than 4% by mass, and is still more preferably equal to or more than 4.5% by mass.

In addition, the content of alcohol in the entire aqueous anti-rust surface treatment composition is, for example, preferably equal to or less than 12% by mass, is more preferably equal to or less than 10% by mass, and is still more preferably equal to or less than 8% by mass.

(Water-Soluble Resin)

The aqueous anti-rust surface treatment composition of this embodiment can contain a water-soluble resin. This water-soluble resin can be a water-soluble or water-dispersible resin which is dissolved or dispersed in water or a mixed solvent with a polar organic solvent such as water and the alcohol. With this, it becomes easy to adjust the film thickness to an appropriate film thickness when the composition is applied. Further, it is also possible to improve the abrasion resistance of the film formed from the composition. In addition, the hardness of the film can be lowered. Further, when the film is formed on the surface of a fastener part such as a bolt and a nut, the friction coefficient of such a film can be reduced.

The water-soluble resin may be appropriately selected from resins which are soluble or dispersible in water. For example, a polyacrylic resin, a water-soluble polyester resin, a water-soluble epoxy resin, a water-soluble polyvinyl butyral resin, a water-soluble phenol resin, a boil oil, oil varnish, an amino resin, an urethane resin, a vinyl resin, a fluororesin, a silicone resin, or a modified product thereof can be used, and a rubber component such as chlorinated rubber and cyclized rubber can also be used.

Among them, from the viewpoints of high availability and ease of adjustment of the film thickness, the aqueous anti-rust surface treatment composition of this embodiment preferably contains one or more kinds of resins selected from the group consisting of a polyacrylic resin, a water-soluble polyester resin, a water-soluble epoxy resin, a water-soluble polyvinyl butyral resin, a water-soluble phenol resin, and a modified product thereof, as the water-soluble or water-dispersible resin.

Incidentally, examples of the modified resin (modified product of the resin) include those subjected to silyl modification, phosphoric acid modification, and silane modification for a specific resin.

From the viewpoint of improving the abrasion resistance of the film and adjusting a film thickness to be moderate when applying the composition, the content in the case where the water-soluble or water-dispersible resin is contained in the aqueous anti-rust surface treatment composition of this embodiment is preferably, for example, equal to or more than 1 part by mass, is more preferably equal to or more than 2 parts by mass, and is still more preferably equal to or more than 3 parts by mass, with respect to 100 parts by mass of content of the silane coupling agent.

From the same viewpoint, the content of the water-soluble or water-dispersible resin is preferably, for example, equal to or less than 150 parts by mass, is more preferably equal to or less than 100 parts by mass, and is still more preferably equal to or less than 80 parts by mass, with respect to 100 parts by mass of content of the silane coupling agent.

The content of the water-soluble or water-dispersible resin is defined as the amount of the solid content of the resin.

(Lubricant)

The aqueous anti-rust surface treatment composition of this embodiment may contain a lubricant depending on use. This makes it possible to improve lubricity of the film.

The lubricant can include a water-soluble wax or a water-dispersible emulsion, specifically, it may be appropriately selected from known lubricants, and examples thereof include a wax component such as a polyethylene wax, a paraffin wax, and an oxidized polyolefin wax.

From the viewpoint of further improving the lubricity of the film, the content of the lubricant in a case of being contained in the aqueous anti-rust surface treatment composition of this embodiment is preferably, for example, equal to or more than 10 parts by mass, is more preferably equal to or more than 15 parts by mass, and is still more preferably equal to or more than 20 parts by mass, with respect to 100 parts by mass of content of the silane coupling agent.

From the same viewpoint, the content of the lubricant is preferably, for example, equal to or less than 100 parts by mass, is more preferably equal to or less than 80 parts by mass, and is still more preferably equal to or less than 60 parts by mass, with respect to 100 parts by mass of content of the silane coupling agent.

As one example of the aqueous anti-rust surface treatment composition of this embodiment, those components may contain only the water-soluble components. That is, in addition to the water-soluble silane coupling agent, the water-soluble transition metal compound, and the water-soluble highly condensed phosphate, the aqueous anti-rust surface treatment composition can be used as a completely water-soluble anti-rust treatment agent containing one or more kinds selected from the group consisting of the aqueous colloidal silica, the water-soluble resin, and the water-soluble surfactant.

(Other Components)

Further, the aqueous anti-rust surface treatment composition of this embodiment can contain various kinds of additives which can contain a surface treatment agent other than the above components.

For example, a pH adjuster other than the above components, a filler, a colorant, a surfactant, a defoaming agent, a leveling agent, an antimicrobial agent, and the like can be contained, and the amounts of these additives can be appropriately set depending on the use.

In an aqueous composition (a water-based coating material) in the technical field, the content of a chromium component in the composition is limited from the viewpoint of environmental consideration, but it contains trivalent chromium or hexavalent chromium.

In contrast, the aqueous anti-rust surface treatment composition of this embodiment does not substantially contain a chromium component such as hexavalent chromium and trivalent chromium.

From the viewpoint of further improving the anti-rust property, it is possible to contain trivalent chromium in a necessary amount, and the amount of the trivalent chromium is preferably limited to 1% by mass or less, is more preferably limited to equal to or less than 0.5% by mass, and is still more preferably limited to equal to or less than 0.1% by mass. Even more preferably, the trivalent chromium is not substantially contained.

Note that, in the present specification, the amounts of hexavalent chromium and trivalent chromium refer to the content of chromium salt having this specific valence number.

[Method of Preparing Aqueous Anti-Rust Surface Treatment Composition]

The aqueous anti-rust surface treatment composition of this embodiment can be prepared by mixing the above-mentioned components and stirring. The order of mixing the components is not limited, and it is possible to mix in any order.

The aqueous anti-rust surface treatment composition of this embodiment can be applied to the surface of a metal member so as to form a film. With this, it is possible to obtain a surface-coated metal member provided with a metal member in which the film consisting of the aqueous anti-rust surface treatment composition is formed on the surface.

As this coating method, an appropriate method according to the size and shape of the metal member can be used. For example, it is possible to employ various methods such as dipping, roll coating, spraying, brush coating, spin coating and the like, depending on the size, shape, and the like of the object to be treated.

In addition, the aqueous anti-rust surface treatment composition of this embodiment can be formed into a firm film by applying a heat treatment after coating the metal member.

As conditions for this heat treatment, for example, conditions of equal to or higher than room temperature and equal to or lower than 250° C. can be employed, and this treatment can be carried out equal to or longer than 5 minutes and equal to or shorter than 240 minutes.

Further, by appropriately adjusting the composition of the aqueous anti-rust surface treatment composition of this embodiment, it is possible to form a firm film by the heating condition at a low temperature such as equal to or higher than room temperature and equal to or lower than 120° C. or the heating condition at a high temperature such as equal to or higher than 180° C. and equal to or lower than 220° C.

The thickness of the film formed after the heat treatment of the aqueous anti-rust surface treatment composition of this embodiment can be appropriately set depending on the use, and from the viewpoint of realizing the higher anti-rust property to the metal member, for example, it may be 0.3 μm or more, is preferably 0.5 μm or more, and is more preferably 1.0 μm or less.

On the other hand, the thickness of this film may be, for example, 50 μm or less, is preferably 30 μm or less, and is more preferably 20 μm or less.

The aqueous anti-rust surface treatment composition of this embodiment can impart the excellent anti-rust property to the metal member, and therefore, it can be used in a wide range. For example, it can be used for automobile parts exposed to high temperature and high humidity conditions, building materials, electronic parts, and the like.

It is needless to say that the uses described here are examples of embodiments in which the present invention is used and it can be applied to other uses as well.

Although the embodiments of the present invention have been described, these are examples of the present invention, and various configurations other than the above can be adopted.

Hereinafter, an example of a reference form will be added.

1. An aqueous anti-rust surface treatment composition which imparts anti-rust performance to a metal member by being applied to the metal member, containing: (a) a silane coupling agent; (b) a titanium chelating agent; (c) a salt of polyphosphoric acid having condensation degree of equal to or more than 4; and water, in which a content of the salt of polyphosphoric acid having condensation degree of equal to or more than 4 can be equal to or more than 1 part by mass and equal to or less than 100 parts by mass, with respect to 100 parts by mass of content of the silane coupling agent.

2. The aqueous anti-rust surface treatment composition as described in 1, further containing: (d) an aqueous colloidal silica.

3. The aqueous anti-rust surface treatment composition as described in 2, in which a solid content of (d) the aqueous colloidal silica is equal to or more than 20 parts by mass and equal to or less than 300 parts by mass with respect to 100 parts by mass of content of (a) the silane coupling agent.

4. The aqueous anti-rust surface treatment composition as described in any one of 1 to 3, further containing: (e) an alcohol.

5. The aqueous anti-rust surface treatment composition as described in 4, in which (e) the alcohol include one or more kinds of alcohols selected from the group consisting of methanol, ethanol, n-propyl alcohol, iso-propyl alcohol, n-butyl alcohol, s-butyl alcohol, and t-butyl alcohol.

6. The aqueous anti-rust surface treatment composition as described in 4 or 5, in which a content of (e) the alcohol is equal to or more than 20 parts by mass and equal to or less than 300 parts by mass with respect to 100 parts by mass of content of (a) the silane coupling agent.

7. The aqueous anti-rust surface treatment composition as described in any one of 1 to 6, in which (a) the silane coupling agent contains an epoxy silane.

8. The aqueous anti-rust surface treatment composition as described in any one of 1 to 7, further containing (f) a water-soluble or water-dispersible resin.

9. The aqueous anti-rust surface treatment composition as described in 8, in which (f) the water-soluble or water-dispersible resin includes one or more kinds of resins selected from the group consisting of a polyacrylic resin, a water-soluble polyester resin, a water-soluble epoxy resin, a water-soluble polyvinyl butyral resin, a water-soluble phenol resin, and a modified product thereof.

10. The aqueous anti-rust surface treatment composition as described in any one of 1 to 9, in which (c) the salt of polyphosphoric acid having condensation degree of equal to or more than 4 is a sodium salt or a potassium salt of polyphosphoric acid.

11. The aqueous anti-rust surface treatment composition as described in any one of 1 to 10, in which a content of (b) titanium chelating agent is equal to or more than 20 parts by mass and equal to or less than 300 parts by mass with respect to 100 parts by mass of content of (a) the silane coupling agent.

12. The aqueous anti-rust surface treatment composition as described in any one of 1 to 11, which does not contain a chromium component.

13. The aqueous anti-rust surface treatment composition as described in any one of 1 to 12, further containing (g) a lubricant.

14. The aqueous anti-rust surface treatment composition as described in anyone of 1 to 13, including a plating layer containing zinc or chromium on the surface of the metal member.

15. A surface-coated metal member including a film formed from the aqueous anti-rust surface treatment composition as described in any one of 1 to 14 on a surface.

EXAMPLES

Hereinafter, the present invention will be described more specifically with reference to examples, but the scope of the present invention is not limited to these examples and the like.

First, raw material components used in this example are shown below.

(A): Silane coupling agent (A-1): Epoxy silane (trade name "SH 6040", 3-glycidoxypropyl trimethoxy silane, prepared by Dow Corning Toray Co., Ltd.)

(A-2): Aminosilane (trade name "KBE 903" prepared by Shin-Etsu Chemical Co., Ltd.)

(B): Water-soluble transition metal compound (B-1) Titanium chelating agent: Titanium lactate (trade name "TC-300" prepared by Matsumoto Fine Chemical Co., Ltd.)

(B-2) Titanium chelating agent: Titanium triethanolaminate (trade name "TC-400" prepared by Matsumoto Fine Chemical Co., Ltd.)

(C): Condensed phosphate (C-1): Sodium ultrapolyphosphate (prepared by Kanto Chemical Co., Inc., a structure in which linear and cyclic ones are bonded to each other, $(nNa_2O \cdot P_2O_5(0<n<1))$ (C-2): Sodium hexametaphosphate (prepared by Kanto Chemical Co., Ltd., cyclic structure, $(NaPO_3)_6$)

(C-3): Sodium tripolyphosphate (prepared by Kanto Chemical Co., Ltd., linear structure, $Na_5P_3O_{10}$)

Water-soluble metal acid salt: Sodium tungstate (prepared by Kanto Kagaku Co., Ltd.)

(D): Aqueous colloidal silica (D-1): Aqueous colloidal silica (prepared by Nippon Shokubai Co., Ltd, trade name "CATALOID SN; average particle diameter of 12 nm)

(E): Polar organic solvent (E-1) Alcohol: isopropyl alcohol (prepared by Daishin-Chemical.Co.Ltd)

(F): Water-soluble resin (F-1): Polyacrylic resin (prepared by Nippon Shokubai Co., Ltd., trade name "AQUALIC AS-56")

(F-2): Polyester resin (prepared by GOO CHEMICAL Co., Ltd., trade name "PLUS COAT 565")

(F-3): Silane-modified polyacrylic resin (prepared by Nippon Synthetic Chemical Industry Co., Ltd., trade name "MOWINYL 8030")

(G): Lubricant (G-1): Polyethylene wax (prepared by BYK, trade name "AQUACER531")

(G-2): Paraffin wax (prepared by BYK, trade name "AQUACER537")

Water: Ion exchanged water

[Preparing of Aqueous Anti-Rust Surface Treatment Composition]

Each component was weighed according to the compounding amount (parts by mass) shown in the following Table 1, and each component was compounded using a stirrer so as to prepare an aqueous anti-rust surface treatment composition. The components (D) and (F) are shown in terms of solid content, and the other components are shown in Table 1 as the blending amounts of the active ingredients, respectively.

[Evaluation]

Regarding the obtained aqueous anti-rust surface treatment composition, evaluation is carried out according to the following method. The results of each evaluation are summarized in Tables 1 and 2.

(Corrosion Resistance)

A 70 mm×150 mm×0.8 mm flat plate including a galvanized layer having a thickness of 8 μm on its surface was prepared and immersed in a liquid of the obtained aqueous anti-rust surface treatment composition for 30 seconds. After dipping, the flat plate was taken out, liquid was removed for 5 minutes, and then a heat treatment was carried out at 120° C. for 10 minutes so as to form a silica film of the aqueous anti-rust surface treatment composition on the flat plate surface. The average film thickness of the obtained silica film was about 1 μm.

The average film thickness was calculated by calculating a volume amount of the silica film from an increase in the weight of the flat plate before and after the formation of the silica film by using dry coated film specific gravity (calculated specific gravity calculated from the added amount of each component and the specific gravity of each component in the aqueous anti-rust surface treatment composition), and dividing the obtained volume amount by a specific surface area of flat plate.

For the sample thus obtained, a salt spray test (SST, test temperature: 35° C.) was carried out in accordance with JIS Z 2371. In addition, each sample was evaluated based on the following criteria. The results are shown in Table 1.

A: White rust is not able to be observed even during a test time of 72 hours.

B: White rust is observed during a test time of 48 hours.

C: White rust is observed during a test time of 24 hours.

(Lubricity)

A bolt of M8×55 mm size with zinc plating having a thickness of about 8 μm was prepared in a zincate bath. The bolt was dipped into the liquid of each aqueous anti-rust surface treatment composition for 30 seconds, then the bolt was taken out from the liquid, put into a stainless steel tea strainer, and put in a centrifuge as being in the tea strainer. The centrifuge was rotated for 1 second at a rotation radius of about 15 cm and a rotation speed of 500 rpm, and excessive liquid on the surface of the bolt was swung off.

The surface-treated bolt by this method was put in a dryer and subjected to a heat treatment at 120° C. for 10 minutes so as to form a silica film.

Regarding the bolt thus obtained in this way, the overall friction coefficient was measured in accordance with JIS B 1084. For each bolt, its evaluation was carried out based on the following criteria. The results are shown in Table 1.

AA: The overall friction coefficient is equal to or more than 0.10 and less than 0.20.

A: The overall friction coefficient is equal to or more than 0.20 and less than 0.30.

B: The overall friction coefficient is equal to or more than 0.30 and less than 0.40.

C: The overall friction coefficient is equal to or more than 0.40.

(Liquid Stability)

The obtained aqueous anti-rust surface treatment composition was put in a 100 mL glass container and allowed to stand in a constant temperature bath at 40° C. for 3 months, and the degree of change was visually observed. Each composition was evaluated based on the following criteria. The results are shown in Table 2.

AA: No change was observed and the liquid stability was good.

A: Slightly thickened, but it was at a level that has no problem in practical use.

C: Gelled part is observed.

TABLE 1

| | | | | Unit | Example 1 | Example 2 | Example 3 | Example 4 | Example 5 | Example 6 | Example 7 | Example 8 | Example 9 | Example 10 | Comparative Example 1 | Comparative Example 2 | Comparative Example 3 | Comparative Example 4 | Comparative Example 5 |
|---|---|---|---|---|---|---|---|---|---|---|---|---|---|---|---|---|---|---|---|
| Aqueous anti-rust surface treatment composition | (A) Silane coupling agent | (A-1) | Epoxy silane | Parts by mass | 100 | 100 | 100 | 100 | 100 | 100 | 100 | 100 | 100 | 100 | 100 | | 100 | 100 | 100 |
| | | (A-2) | Amino-silane | | | | | | | | | | | | | 100 | | | |
| | (B) Water-soluble transition metal compound | (B-1) | Titanium lactate | | 60 | 20 | 200 | 60 | 60 | | 60 | 60 | 60 | 60 | 60 | 60 | 60 | 60 | |
| | | (B-2) | Titanium triethanolaminate | | | | | | | 60 | | | | | | | | | |
| | (C) Condensed phosphate | (C-1) | Sodium ultra polyphosphate | | 20 | 20 | 20 | 20 | 20 | 20 | 20 | | 20 | 20 | | | | | |
| | | (C-2) | Sodium hexametaphosphate | | | | | | | | | 20 | | | | | | | |

TABLE 1-continued

| | | | Unit | Example 1 | Example 2 | Example 3 | Example 4 | Example 5 | Example 6 | Example 7 | Example 8 | Example 9 | Example 10 | Comparative Example 1 | Comparative Example 2 | Comparative Example 3 | Comparative Example 4 | Comparative Example 5 |
|---|---|---|---|---|---|---|---|---|---|---|---|---|---|---|---|---|---|---|
| | (C-3) | Sodium tripolyphosphate | | | | | | | | | | | | | | 20 | | |
| Water-soluble metal acid salt | | Sodium tungstate | | | | | | | | | | | | | | | 20 | |
| (D) Aqueous colloidal silica | (D-1) | Aqueous colloidal silica | | 660 | 660 | 660 | 660 | 660 | 660 | 1000 | 660 | 660 | 660 | 660 | 660 | 660 | 660 | 660 |
| (E) Polar organic solvent | (E-1) | Isopropyl alcohol | | 100 | 100 | 100 | 100 | 100 | 100 | 100 | 100 | 100 | 100 | 100 | 100 | 100 | 100 | 100 |
| (F) Water-soluble resin | (F-1) | Polyacrylic resin | | 60 | 60 | 60 | | | 60 | 60 | 60 | 60 | 60 | 60 | 60 | 60 | 60 | 60 |
| | (F-2) | Polyester resin | | | | | 60 | | | | | | | | | | | |
| | (F-3) | Silane-modified polyester | | | | | | 60 | | | | | | | | | | |
| (G) Lubricant | (G-1) | Polyethylene wax | | | | | | | | | | 40 | | | | | | |
| | (G-2) | Paraffin wax | | | | | | | | | | | 40 | | | | | |
| Water | | Ion exchanged water | | 1000 | 1040 | 860 | 1000 | 1000 | 1000 | 680 | 1000 | 1000 | 1000 | 1020 | 1020 | 1000 | 1000 | 1080 |
| Evaluation | | Corrosion resistance | | A | A | A | A | A | A | A | A | A | A | C | B | B | C | C |
| | | Lubricity | | A | A | A | A | A | A | A | A | AA | AA | A | A | A | B | A |

TABLE 2

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Evaluation | Liquid stability | AA | AA | AA | AA | AA | A | AA | AA | AA | AA |

It was found that the anti-rust properties of the metal member can be improved in the aqueous anti-rust surface treatment composition of each example because the corrosion resistance of the film is higher than each comparative example.

The aqueous anti-rust surface treatment composition of the present invention can be used to form a film having high corrosion resistance on a surface of a metal member. Accordingly, it is expected that the aqueous anti-rust surface treatment composition of the present invention can be developed for each industrial application handling metal members such as automotive parts.

Priority is claimed on Japanese Patent Application No. 2016-094443, filed on May 10, 2016, the content of which is incorporated herein by reference.

The invention claimed is:

1. An aqueous anti-rust surface treatment composition used for forming a film on a surface of a metal member, comprising:
    a silane coupling agent;
    a water-soluble transition metal compound containing a water-soluble titanium compound or a water-soluble zirconium compound;
    a condensed phosphate; and
    a solvent containing water and an alcohol,
    wherein the condensed phosphate contains a highly condensed phosphate which is a salt of high condensate of equal to or more than four phosphoric acids,
    wherein a content of the highly condensed phosphate which is a salt of high condensate of equal to or more than four phosphoric acids is equal to or more than 1 part by mass and equal to or less than 100 parts by mass, with respect to 100 parts by mass of content of the silane coupling agent, and the content of the alcohol is equal to or more than 20 parts by mass and equal to or less than 300 parts by mass, with respect to 100 parts by mass of content of the silane coupling agent.

2. The aqueous anti-rust surface treatment composition according to claim 1, wherein the highly condensed phosphate contains the highly condensed phosphate having a cyclic structure.

3. The aqueous anti-rust surface treatment composition according to claim 1, wherein the highly condensed phosphate is a sodium salt or a potassium salt.

4. The aqueous anti-rust surface treatment composition according to claim 1, wherein the water-soluble titanium compound contains a titanium chelating agent.

5. The aqueous anti-rust surface treatment composition according to claim 1, further comprising:

an aqueous colloidal silica.

6. The aqueous anti-rust surface treatment composition according to claim 1, further comprising:

a polar organic solvent.

7. The aqueous anti-rust surface treatment composition according to claim 6, wherein the polar organic solvent contains an alcohol.

8. The aqueous anti-rust surface treatment composition according to claim 1, further comprising:

a water-soluble resin.

9. The aqueous anti-rust surface treatment composition according to claim 8, wherein the water-soluble resin includes one or more kinds of resins selected from the group consisting of a polyacrylic resin, a water-soluble polyester resin, a water-soluble epoxy resin, a water-soluble polyvinyl butyral resin, a water-soluble phenol resin, and a modified product thereof.

10. The aqueous anti-rust surface treatment composition according to claim 1, wherein the silane coupling agent contains epoxy silane.

11. The aqueous anti-rust surface treatment composition according to claim 1, further comprising:

a lubricant.

12. The aqueous anti-rust surface treatment composition according to claim 1, which does not contain a chromium component.

13. The aqueous anti-rust surface treatment composition according to claim 1, further comprising:

a plating layer containing zinc or chromium on the surface of the metal member.

14. A surface-coated metal member comprising:

a metal member; and a film formed of the aqueous anti-rust surface treatment composition according to claim 1, the film being formed on the surface of the metal member.

15. An aqueous anti-rust surface treatment composition which imparts anti-rust performance to a metal member by being applied to a surface of the metal member, comprising:

a silane coupling agent;

a titanium chelating agent;

a salt of polyphosphoric acid having condensation degree of equal to or more than 4;

water, and an alcohol, wherein a content of the salt of polyphosphoric acid having condensation degree of equal to or more than 4 is equal to or more than 1 part by mass and equal to or less than 100 parts by mass, with respect to 100 parts by mass of content of the silane coupling agent, and the content of the alcohol is equal to or more than 20 parts by mass and equal to or less than 300 parts by mass, with respect to 100 parts by mass of content of the silane coupling agent.

\* \* \* \* \*